(12) United States Patent
Kasuga et al.

(10) Patent No.: US 9,145,849 B2
(45) Date of Patent: Sep. 29, 2015

(54) ENGINE FUELED BY AMMONIA WITH SELECTIVE REDUCTION CATALYST

(75) Inventors: Shunsuke Kasuga, Susono (JP); Atushi Watanabe, Shizuoka (JP); Shin-ichiro Tanaka, Mishima (JP); Osamu Azegami, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 1111 days.

(21) Appl. No.: 13/144,404

(22) PCT Filed: Jan. 14, 2009

(86) PCT No.: PCT/JP2009/050785
§ 371 (c)(1),
(2), (4) Date: Oct. 20, 2011

(87) PCT Pub. No.: WO2010/082360
PCT Pub. Date: Jul. 22, 2010

(65) Prior Publication Data
US 2012/0047870 A1    Mar. 1, 2012

(51) Int. Cl.
*F02M 21/10*      (2006.01)
*F02C 3/22*       (2006.01)
(Continued)

(52) U.S. Cl.
CPC ............ *F02M 21/10* (2013.01); *F02C 3/22* (2013.01); *F02C 3/28* (2013.01); *F02C 7/22* (2013.01);
(Continued)

(58) Field of Classification Search
CPC .............. F02C 3/22; F02C 3/28; F02C 7/22; F02C 7/224; F02D 19/12; F02M 21/10; F23J 15/02; F23J 2219/10; F23R 3/286; F23R 2900/00002; F05D 2270/082; F23L 2900/00001; Y02T 10/121; Y02T 10/34
USPC ......... 60/39.461, 39.465, 299, 39.5, 806, 736
See application file for complete search history.

(56) References Cited

U.S. PATENT DOCUMENTS 2,559,814 A    7/1951    Whittle
3,313,103 A    4/1967    Johnson
(Continued)

FOREIGN PATENT DOCUMENTS

CA    2231749 A1    9/1998
CN    1743052 A     3/2006
(Continued)

OTHER PUBLICATIONS

Jan. 17, 2013 Office Action issued in U.S. Appl. No. 12/827,409.
(Continued)

*Primary Examiner* — Gerald L Sung
*Assistant Examiner* — Carlos A Rivera
(74) *Attorney, Agent, or Firm* — Oliff PLC

(57) ABSTRACT

A combuster (2) of a gas turbine engine (1) is fed with gaseous ammonia and that gaseous ammonia is burned to drive a turbine (3). Inside the exhaust passage of the gas turbine engine (1), an $NO_x$ selective reduction catalyst (10) is arranged. Inside one or both of the intake passage of the gas turbine engine (1) or the exhaust passage upstream of the $NO_x$ selective reduction catalyst (10), ammonia is fed. This ammonia is used to reduce the $NO_x$ which is contained in the exhaust gas at the $NO_x$ selective reduction catalyst (10).

10 Claims, 9 Drawing Sheets

(51) Int. Cl.
    *F02C 3/28* (2006.01)
    *F02C 7/22* (2006.01)
    *F02C 7/224* (2006.01)
    *F02D 19/12* (2006.01)
    *F23J 15/02* (2006.01)
    *F23R 3/28* (2006.01)

(52) U.S. Cl.
    CPC ............ *F02C 7/224* (2013.01); *F02D 19/12* (2013.01); *F23J 15/02* (2013.01); *F23R 3/286* (2013.01); *F05D 2270/082* (2013.01); *F23J 2219/10* (2013.01); *F23L 2900/00001* (2013.01); *F23R 2900/00002* (2013.01); *Y02T 10/121* (2013.01); *Y02T 10/34* (2013.01)

(56) References Cited

U.S. PATENT DOCUMENTS

| | | | | |
|---|---|---|---|---|
| 4,131,432 | A | * | 12/1978 | Sato et al. ............. 422/177 |
| 5,555,718 | A | * | 9/1996 | Anderson et al. ........ 60/783 |
| 6,074,619 | A | * | 6/2000 | Schoubye .............. 423/239.1 |
| 6,216,443 | B1 | | 4/2001 | Utamura |
| 6,286,301 | B1 | | 9/2001 | Utamura |
| 7,954,311 | B2 | | 6/2011 | Shaikh et al. |
| 7,966,807 | B2 | * | 6/2011 | Norris et al. ............ 60/226.1 |
| RE42,875 | E | | 11/2011 | Fischer et al. |
| 8,220,268 | B2 | | 7/2012 | Callas |
| 2005/0198943 | A1 | * | 9/2005 | Breuer et al. ............ 60/286 |
| 2006/0029534 | A1 | | 2/2006 | Eiteneer et al. |
| 2008/0250774 | A1 | | 10/2008 | Solbrig |
| 2010/0024379 | A1 | * | 2/2010 | Sengar et al. ............ 60/39.5 |

FOREIGN PATENT DOCUMENTS

| | | |
|---|---|---|
| JP | A-02-055835 | 2/1990 |
| JP | A-05-332152 | 12/1993 |
| JP | A-10-259736 | 9/1998 |
| JP | A-11-287132 | 10/1999 |
| JP | A-2003-328860 | 11/2003 |
| JP | A-2004-204109 | 7/2004 |

OTHER PUBLICATIONS

International Search Report issued in Application No. PCT/JP2009/050785; Dated Feb. 17, 2009.

* cited by examiner (A)

(B)

(A)

(B)

ENGINE FUELED BY AMMONIA WITH SELECTIVE REDUCTION CATALYST

TECHNICAL FIELD

The present invention relates to an engine.

BACKGROUND ART

In a gas turbine engine, gasoline engine, diesel engine, or other engine, in the past the fuel used has mainly been natural gas or fossil fuel (for example, see Japanese Patent Publication (A) No. 10-259736). However, if burning such fuels, there is the problem of the production of $CO_2$ causing global warming. Further, there is also the problem that these fuels will all eventually end up being depleted. Further, in engines, if burning fuel, $NO_x$ will be produced. Therefore, when using an engine, it is necessary to suppress the release of $NO_x$ into the atmosphere.

DISCLOSURE OF INVENTION

An object of the present invention is to provide an engine using ammonia as fuel so as to achieve combustion without producing $CO_2$ and, further, using the action of this ammonia in reducing $NO_x$ so as to greatly reduce the amount of $NO_x$ discharged into the atmosphere.

According to the present invention, there is provided an engine fueled by ammonia which arranges in an exhaust passage of the engine an $NO_x$ selective reduction catalyst able to selectively reduce $NO_x$ contained in exhaust gas in the presence of ammonia, wherein fuel feeding means for feeding fuel comprised of gaseous ammonia in a combustion chamber of the engine is provided, and ammonia is fed to one or both of an inside of an intake passage of the engine or an inside of an exhaust passage upstream of the $NO_x$ selective reduction catalyst so as to reduce the $NO_x$ contained in the exhaust gas at the $NO_x$ selective reduction catalyst by fed ammonia.

BEST MODE FOR CARRYING OUT THE INVENTION

Figure 1:
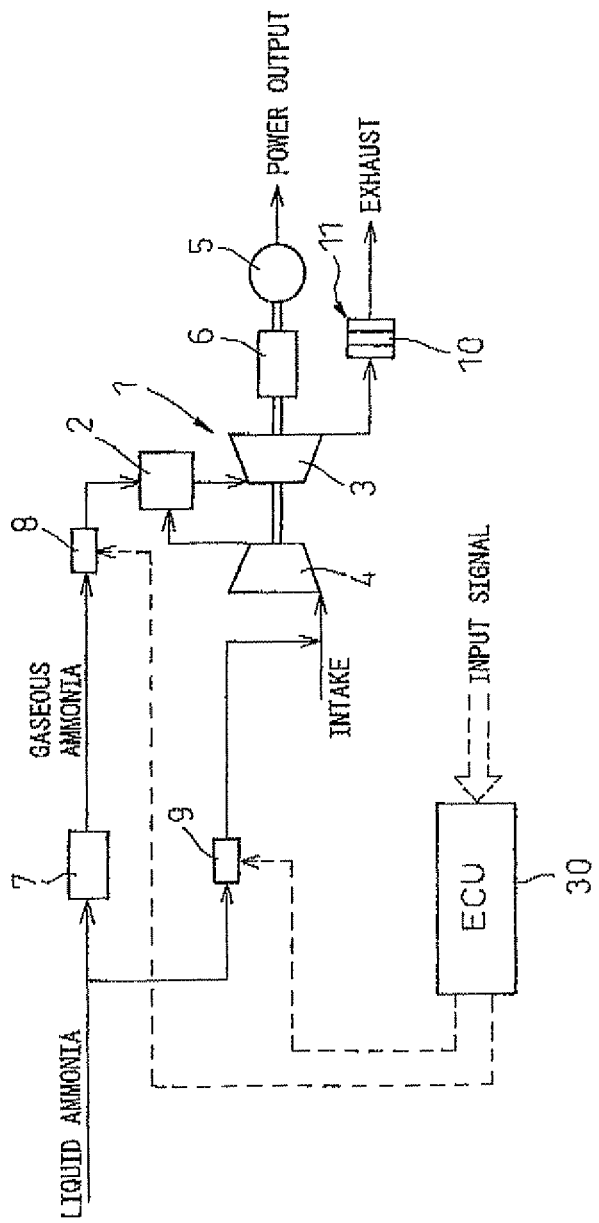
FIG. 1 is a system diagram of a power plant according to the present invention.

FIG. 1 is a system diagram of a power plant according to the present invention. Referring to FIG. 1, 1 indicates a gas turbine engine, 2 a combuster of the gas turbine engine, 3 a turbine, 4 a compressor driven by a turbine 3, 5 a generator driven by the gas turbine engine 1 via a reduction gear device 6, 7 a gasifying device of fuel, 8 and 9 fuel metering valves, 10 an $NO_x$ selective reduction catalyst arranged in an exhaust passage of the turbine 3, that is, in an exhaust passage of the gas turbine engine 1, and 11 an electronic control unit ECU. Note that, in the example shown in FIG. 1, the $NO_x$ selective reduction catalyst 10 is arranged in the exhaust heat recovery device 11.

The $NO_x$ selective reduction catalyst 10 is for example comprised of a honeycomb structure carrying titania $TiO_2$. This $NO_x$ selective reduction catalyst 10 can selectively reduce $NO_x$ contained in exhaust gas in the presence of ammonia. On the other hand, the electronic control unit 30 receives as input a signal showing the output of the generator 5, a signal showing the speed of the generator 5, a signal showing an outlet temperature of the compressor 4, a signal showing an inlet temperature of the compressor 4, a signal showing an outlet pressure of the compressor 4, a signal showing an inlet temperature of the turbine 3, a signal showing an $NO_x$ concentration in the exhaust gas passing through the $NO_x$ selective reduction catalyst 10, a signal showing the air temperature, and various other input signals. The metering valves 8 and 9 are controlled by output signals of the electronic control unit 30 based on these input signals etc.

Figure 2:
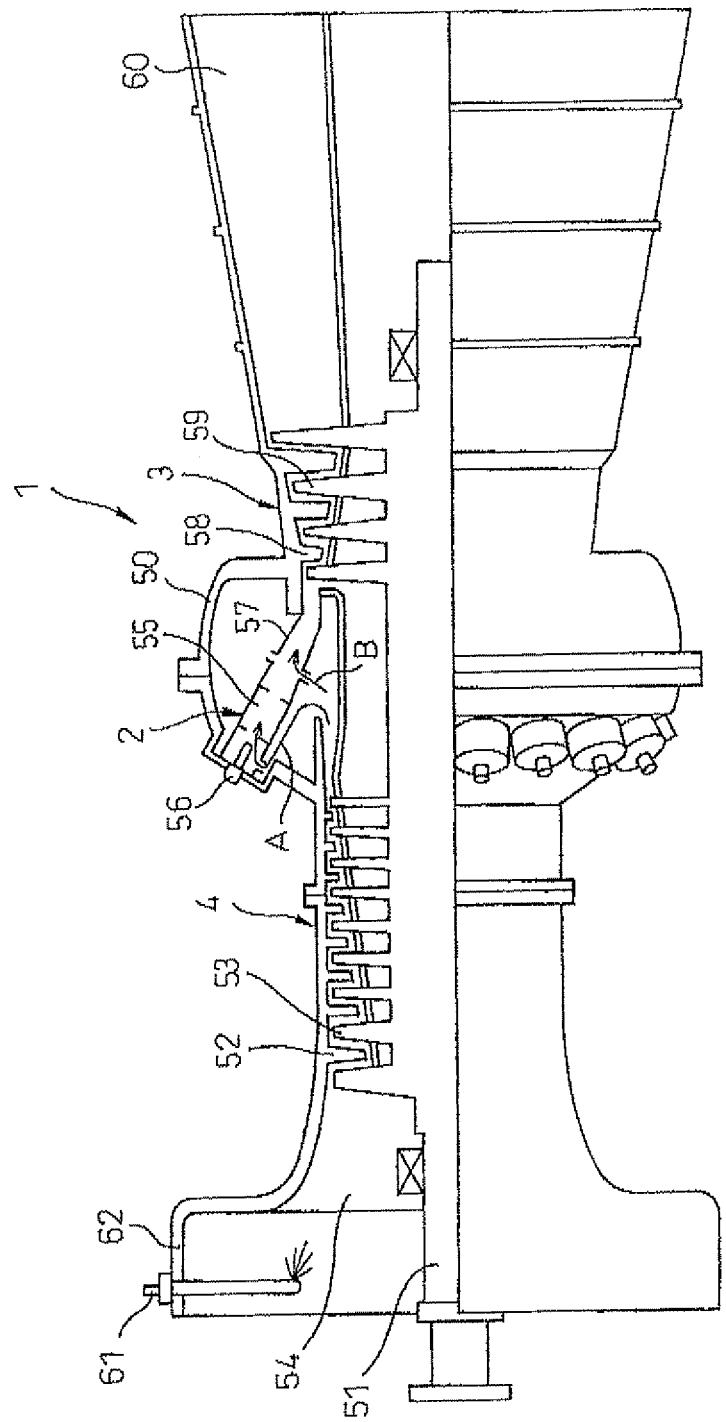
FIG. 2 is a view illustratively showing one example of a gas turbine engine.

FIG. 2 shows a partial cross-sectional side view illustratively showing an example of the gas turbine engine 1 of FIG. 1.

Referring to FIG. 2, inside a casing 50 of the gas turbine 1, an output shaft 51 is rotatably supported. This output shaft 51 is coupled through the reduction gear device 6 to the generator 5. The compressor 4 is comprised of a multistage compressor having a plurality of stationary blades 52 supported by the casing 50 and a plurality of moving blades 53 formed on the output shaft 51. Intake air sucked in from an intake port 54 is compressed by the compressor 4 and fed into a combuster 2.

A plurality of combusters 2 are arranged around the output shaft 51. Each combuster 2 is comprised of a combustion chamber 55, a fuel feed device 56 for feeding fuel into the combustion chamber 55, and a combuster tail pipe 57 extending from the combustion chamber 55 toward the turbine 3. Part of the compressed air flowing out from the compressor 4, as shown by the arrow A in FIG. 2, is fed into the combustion chamber 55. The fuel fed from the fuel feed device 56 is made to burn in the combustion chamber 55. The combustion gas in the combustion chamber 55 is fed through the combuster tail pipe 57 into the turbine 3 where it is used to give the turbine 3 a rotary force.

On the other hand, part of the compressed air flowing out from the compressor 4 is, as shown in FIG. 2 by the arrow B, fed into the combuster tail pipe 57 so that the inlet temperature of the turbine 3 does not excessively rise. In the combustion chamber 55, close to 100% complete combustion is performed, but as explained above, compressed air is fed into the combuster tail pipe 57, so the combustion gas fed into the turbine 3 becomes an excess of air. The turbine 3 is comprised of a multistage turbine having a plurality of stationary blades 58 supported by the casing 50 and a plurality of moving blades 59 formed on the output shaft 51. The combustion gas flowing out from the turbine 3 forms exhaust gas which is then exhausted from an exhaust port 60.

Now, in the present invention, ammonia is used as a fuel. Gaseous ammonia is fed from the fuel feed device 56 into the combustion chamber 55. This gaseous ammonia is made to burn in the combustion chamber 55. The combustion gas of the gaseous ammonia is used to give the turbine 3 a rotary force. When ammonia burns, it forms $N_2$ and $H_2O$. Almost no $CO_2$ is produced at all. Therefore, this gas turbine engine 1 does not exhaust any $CO_2$ at all.

In this way, if the gaseous ammonia is made to burn, $CO_2$ is not produced, but $NO_x$ is produced. Therefore, the exhaust gas exhausted from the gas turbine engine 1 contains $NO_x$. In the present invention, this $NO_x$ is reduced in the $NO_x$ selective reduction catalyst 10 arranged inside the exhaust passage of the gas turbine engine 1 (FIG. 1). At this time, for the $NO_x$ selective reduction catalyst 10 to reduce the $NO_x$, ammonia is necessary. Below, the method of feeding this ammonia will be explained.

That is, according to the present invention, inside the intake passage of the gas turbine engine 1, an ammonia feed device is arranged for feeding liquid ammonia. Liquid ammonia is fed from this ammonia feed device to the inside of the intake passage. In the example shown in FIG. 2, this ammonia feed device 61 is arranged inside an intake duct 62. Liquid ammonia is fed from this ammonia feed device 61 to the inside of the intake port 54.

The boiling point of ammonia is −33.5° C. The latent heat of vaporization when liquid ammonia vaporizes is four times that of gasoline and extremely large. Therefore, if liquid ammonia is injected from the ammonia feed device 61 into the intake air, the latent heat of vaporization of the liquid ammonia causes the intake air to be powerfully cooled. Consequently, the inlet temperature of the turbine 3 is made to greatly fall.

On the other hand, there is a maximum allowable temperature to the inlet temperature of the turbine 3 from the viewpoint of durability. In this case, if making the inlet temperature of the turbine 3 rise to this maximum allowable temperature, the output of the gas turbine engine 1 becomes maximum. In this regard, as explained above, if the intake air is cooled and the inlet temperature of the turbine 3 is made to fall, at this time, it becomes possible to increase the amount of fuel fed from the fuel feed device 56 until the inlet temperature of the turbine 3 reaches the maximum allowable temperature. If the amount of fuel fed from the fuel feed device 56 can be increased, the maximum output of the gas turbine engine 1 when the inlet temperature of the turbine 3 reaches the maximum allowable temperature will increase. Therefore, if cooling the intake air, it becomes possible to raise the maximum output of the gas turbine 1. That is, by feeding liquid ammonia from the ammonia feed device 61 into the intake air, the maximum output of the gas turbine engine 1 can be raised.

On the other hand, if liquid ammonia is fed from the ammonia feed device 61 into the intake air, the compressed air flowing out from the compressor 4 will contain ammonia. As shown in FIG. 2 by the arrow A, part of the ammonia contained in the compressed air fed into the combustion chamber 55 is made to burn in the combustion chamber 55. The remainder of the ammonia is fed into the turbine 3 in the form of unburned ammonia without being made to burn. On the other hand, as shown in FIG. 2 by the arrow B, the ammonia contained in the compressed air fed into the combustor tail pipe 57 is also fed into the turbine 3 in the form of unburned ammonia.

The unburned ammonia fed into the turbine 3 is exhausted into the exhaust passage of the gas turbine engine 1. Next, this unburned ammonia is fed into the $NO_x$ selective reduction catalyst 10. Therefore, the $NO_x$ contained in the exhaust gas is made to be reduced by the unburned ammonia exhausted into the exhaust passage in the $NO_x$ selective reduction catalyst 10. Note that, if running liquid ammonia into the intake air flowing into the compressor 4, this ammonia is sufficiently mixed with the intake air in the compressor 4. Further, the unburned ammonia is sufficiently mixed in the turbine 3. Therefore, the distribution of concentration of the unburned ammonia in the exhaust gas flowing into the $NO_x$ selective reduction catalyst 10 becomes uniform and consequently the action of the $NO_x$ selective reduction catalyst 10 in reducing the $NO_x$ is made to improve.

In this way, in the present invention, the liquid ammonia fed from the ammonia feed device 61 performs two actions: the action of cooling the intake air and the action of reducing the $NO_x$ in the $NO_x$ selective reduction catalyst 10. Further, by feeding liquid ammonia into the intake air flowing into the compressor 4, it is possible to make the distribution of the concentration of the unburned ammonia in the exhaust gas flowing into the $NO_x$ selective reduction catalyst 10 uniform and consequently possible to make the action of the $NO_x$ selective reduction catalyst 10 in reducing the $NO_x$ better.

On the other hand, returning again to FIG. 1, for example, liquid ammonia which is stored in a not shown ammonia storage tank is on the one hand fed through the gasifying device 7 and the metering valve 8 to the combuster 2 and on the other hand is fed through the metering valve 9 into the intake flowing into the compressor 4, that is, the intake air. On the other hand, the exhaust gas which is exhausted from the turbine 3 is fed into the $NO_x$ selective reduction catalyst 10. The gasifying device 7 is provided with an evaporator which for example uses electric heating to convert liquid ammonia to gaseous ammonia and a gas compressor for boosting the gaseous ammonia to the feed pressure in the combuster 2. As shown in FIG. 1, the gaseous ammonia which is fed out from the gasifying device 7 is fed through the metering valve 8 to the combuster 2.

In the same way as other fuels, ammonia also becomes easier to burn if gasified. Therefore, in the present invention, the liquid ammonia is gasified to make it burn in the combuster 2. Note that in this case, in the present invention, the same liquid ammonia is used as the liquid ammonia which is used for generating the gaseous ammonia which is fed into the combustion chamber 55 of the combuster 2 and the liquid ammonia which is fed into the intake passage of the gas turbine engine 1, therefore it is possible to streamline the power generation system.

In FIG. 1, the amount of fuel which is fed to the combuster 2, that is, the amount of gaseous ammonia, is controlled by the metering valve 8 so that the power output becomes the demanded power output. On the other hand, the amount of liquid ammonia which is fed into the intake passage of the gas turbine engine 1 is controlled by the metering valve 9 so that the amount of unburned ammonia becomes an amount enabling the $NO_x$ which is contained in the exhaust gas to be reduced by a predetermined setting or more, for example, by a predetermined reduction rate or more. In this case, the amount of feed of the liquid ammonia is either set in accordance to the operating state of the gas turbine engine 1 to the optimal feed amount found in advance by experiments or is feedback controlled so that the $NO_x$ concentration from the $NO_x$ selective reduction catalyst 10 which is detected by an $NO_x$ concentration sensor becomes a predetermined range of concentration.

Figure 3:
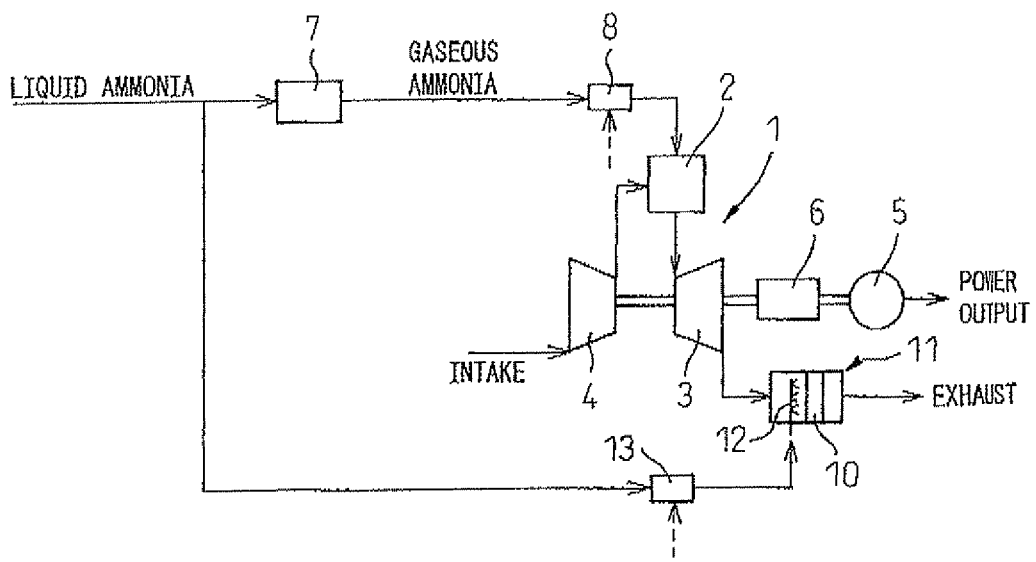
FIG. 3 is a system diagram of another embodiment of a power plant.

FIG. 3 shows another embodiment of a power plant. As shown in FIG. 3, in this embodiment, upstream of the $NO_x$ selective reduction catalyst 10, an ammonia feed device 12 is arranged for feeding ammonia to the $NO_x$ selective reduction catalyst 10. The liquid ammonia is sprayed through the metering valve 13 from this ammonia feed device 12 toward the $NO_x$ selective reduction catalyst 10. In this embodiment, the $NO_x$ which is contained in the exhaust gas is reduced in the $NO_x$ selective reduction catalyst 10 by the liquid ammonia which is fed from the ammonia feed device 12.

In this embodiment as well, the same liquid ammonia is used as the liquid ammonia which is used for generating the gaseous ammonia which is fed into the combustion chamber 55 of the combuster 2 and the liquid ammonia which is fed from the ammonia feed device 12 to the inside of the exhaust passage. Therefore, it is possible to streamline the power generation system.

Figure 4:
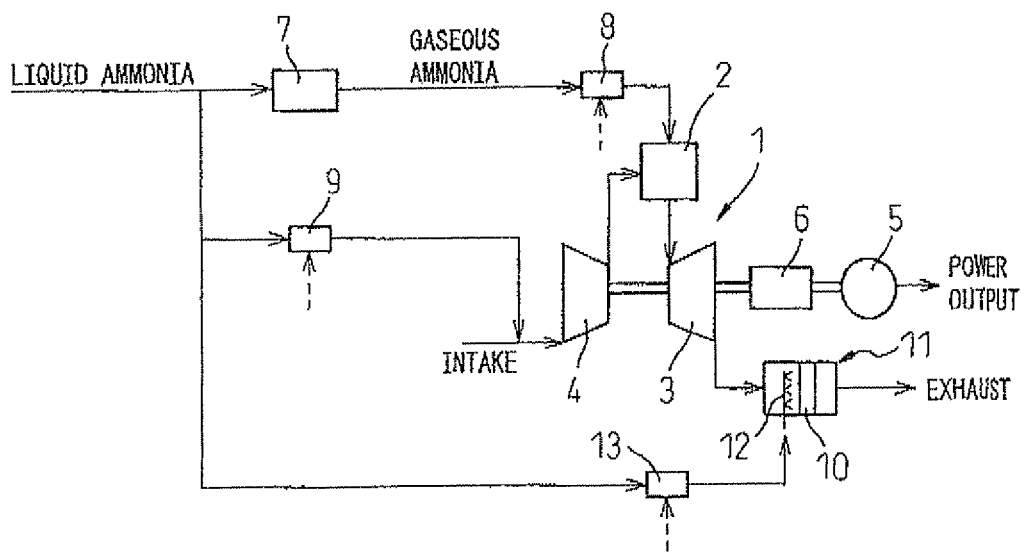
FIG. 4 is a system diagram of still another embodiment of a power plant.

FIG. 4 shows still another embodiment of a power plant. In this embodiment, the liquid ammonia is on the other hand fed into the intake air and on the other hand is fed from the ammonia feed device 12 to the $NO_x$ selective reduction catalyst 10. In this embodiment, when the amount of unburned ammonia which flows out from the turbine 3 is insufficient for reducing the $NO_x$ which is contained in the exhaust gas by a predetermined set value or more, for example, by a predetermined reduction rate or more, the insufficient amount of ammonia is fed from the ammonia feed device 12 to the $NO_x$ selective reduction catalyst 10.

Figure 5:
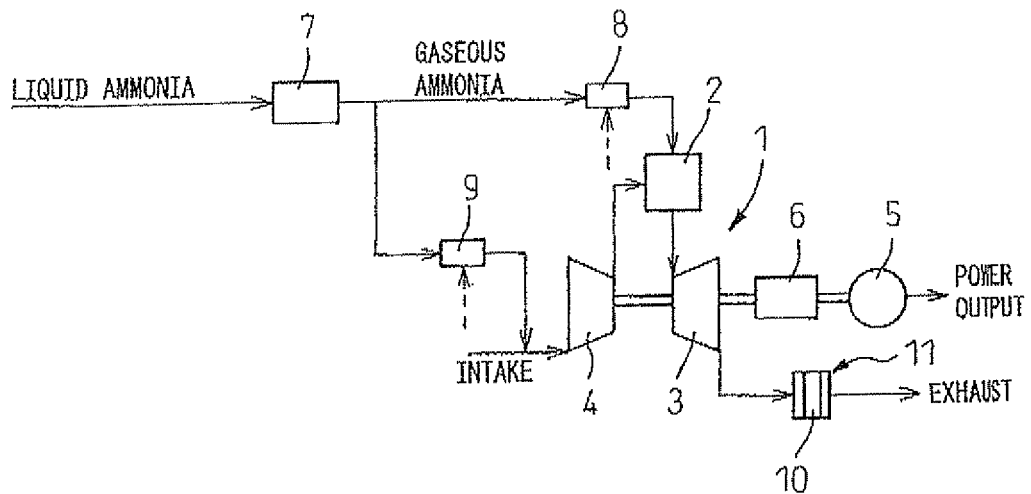
FIG. 5 is a system diagram of still another embodiment of a power plant.

FIG. 5 shows still another embodiment of a power plant. In this embodiment, gaseous ammonia which is fed out from the gasifying device 7 is fed through the metering valve 9 to the inside of the intake air. Due to this gaseous ammonia, the $NO_x$ which is contained in the exhaust gas is reduced at the $NO_x$ selective reduction catalyst 10. In this embodiment, no cooling action is performed on the intake air, but gaseous ammonia which is fed into the intake air is sufficiently mixed inside the compressor 4 and inside the turbine 3. As a result, the distribution of concentration of unburned ammonia in the exhaust gas which flows into the $NO_x$ selective reduction catalyst 10 becomes uniform and therefore the reduction action of $NO_x$ by the $NO_x$ selective reduction catalyst 10 is improved.

Figure 6:
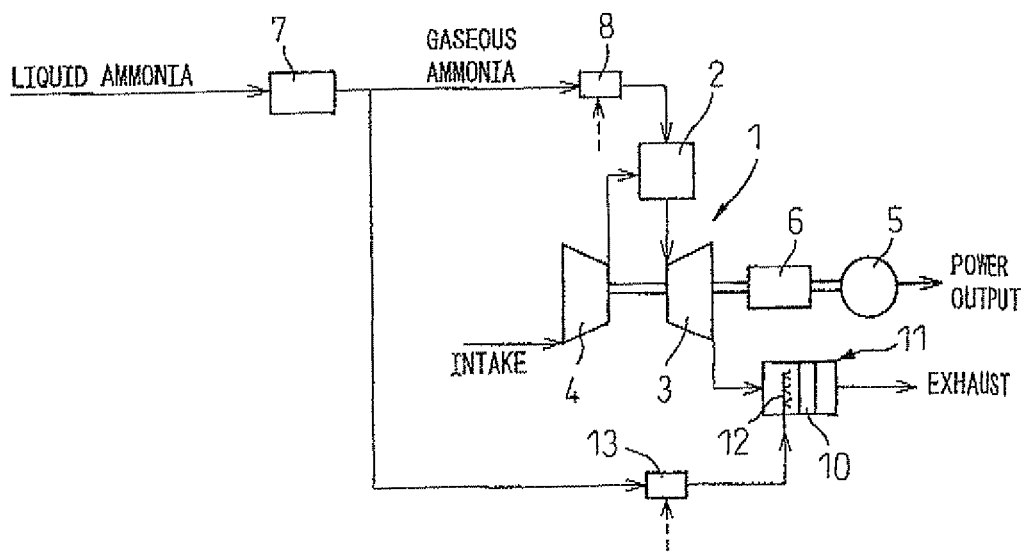
FIG. 6 is a system diagram of still another embodiment of a power plant.

FIG. 6 shows still another embodiment of a power plant. In this embodiment, the gaseous ammonia which is fed out from the gasifying device 7 is fed through the metering valve 13 from the ammonia feed device 12 to the $NO_x$ selective reduction catalyst 10. Due to this gaseous ammonia, the $NO_x$ which is included in the exhaust gas is reduced at the $NO_x$ selective reduction catalyst 10. The reduction action of the $NO_x$ becomes better when the ammonia which is fed from the ammonia feed device 12 is gaseous compared with when it is liquid, therefore in this embodiment as well, the reduction action of $NO_x$ by the $NO_x$ selective reduction catalyst 10 is improved.

Figure 7:
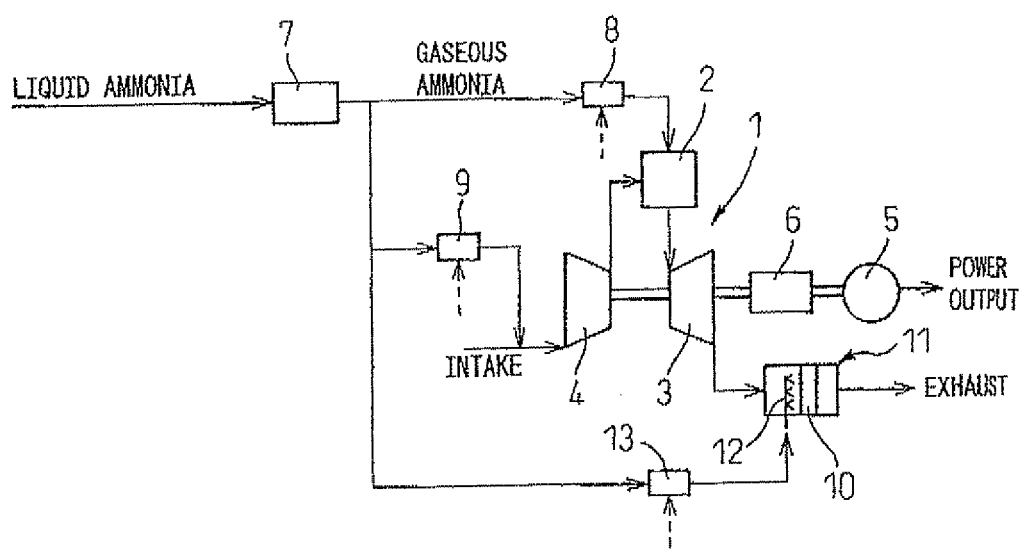
FIG. 7 is a system diagram of still another embodiment of a power plant.

FIG. 7 shows still another embodiment of a power plant. In this embodiment, gaseous ammonia which is fed out from the gasifying device 7 is on the other hand fed through the metering valve 9 into the intake air and on the other hand is fed through the metering valve 13 from the ammonia feed device 12 to the $NO_x$ selective reduction catalyst 10.

In the embodiment shown in FIG. 5 to FIG. 7, the same gaseous ammonia is used as the gaseous ammonia which is fed into the combustion 55 chamber of the combuster 2 and the gaseous ammonia which is fed into the intake passage or exhaust passage of the gas turbine engine 1. Therefore, it is possible to streamline the power plant. Note that, for example, in the example shown in FIG. 7, as shown in FIG. 4, liquid ammonia can be fed into the intake air.

FIG. 8 to FIG. 11 shows various embodiments relating to the generation and feed control of gaseous ammonia. Note that these FIG. 8 to FIG. 11 show the case such as shown as a representative example in FIG. 4 where the liquid fuel is fed to the intake passage and exhaust passage.

Referring to FIG. 8(A), in this embodiment, inside the exhaust passage of the gas turbine engine 1, a gaseous ammonia generating device 14 is arranged which uses the exhaust gas heat to convert the liquid ammonia to gaseous ammonia. The generated gaseous ammonia is boosted in pressure by a gas compressor 15, then is fed through the metering valve 8 to the inside of the combustion chamber 55 of the combuster 2. In the embodiment shown in FIG. 8(A), the gaseous ammonia generating device 14 is arranged in the exhaust passage downstream of the $NO_x$ selective reduction catalyst 10. This gaseous ammonia generating device 14 is for example comprised of an evaporator which uses the exhaust gas heat to vaporize the liquid ammonia. Therefore, in this embodiment, the gaseous ammonia generating device 14 forms the exhaust heat recovery device. In this way, in this embodiment, the exhaust gas heat is effectively utilized for generation of gaseous ammonia.

Further, in the embodiment shown in FIG. 8(A), a gaseous ammonia storage tank 16 is provided for storing the gaseous ammonia which is generated by the gaseous ammonia generating device 14. At the time of engine startup, the gaseous ammonia which is stored in the gaseous ammonia storage tank 16 is boosted in pressure by the gas compressor 15 and fed into the combustion chamber 55 of the combuster 2.

That is, the inside of the gaseous ammonia storage tank 16 is connected through a shut-off valve which for example can be opened during operation of the gas turbine engine 1 to a gaseous ammonia passage from the gaseous ammonia generating device 14 toward the gas compressor 15. Therefore, during operation of the gas turbine 1, the gaseous ammonia which is generated at the gaseous ammonia generating device 14 is stored inside the gaseous ammonia storage tank 16. Next, if the operation of the gas turbine engine 1 is stopped, the shut-off valve is closed, so gaseous ammonia continues to be stored in the gaseous ammonia storage tank 16. Next, if the operation of the gas turbine engine 1 is resumed, the shut-off valve is again opened. At this time, at the gaseous ammonia generating device 14, the gaseous ammonia generation action has yet to be started. At this time, the gaseous ammonia in the gaseous ammonia storage tank 16 is boosted in pressure by the gas compressor 15 and fed to the combustion chamber 55 of the combuster 2.

In the modification shown in FIG. 8(B), to utilize a higher temperature exhaust gas heat, the gaseous ammonia generating device 14 is arranged upstream of the $NO_x$ selective reduction catalyst 10.

Figure 9:
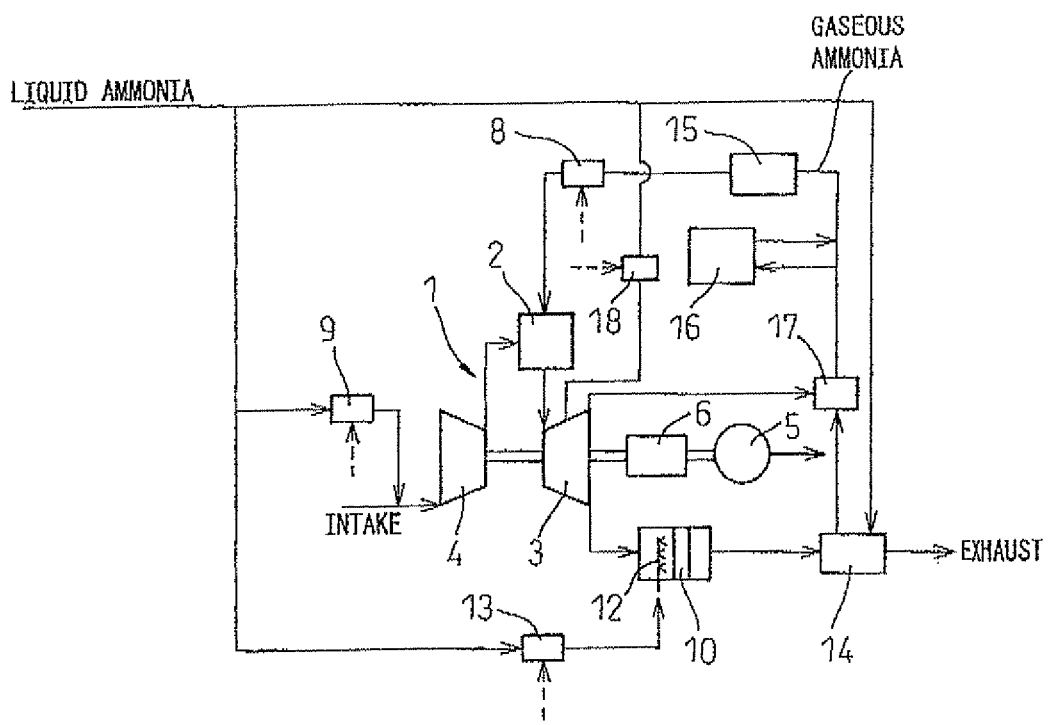
FIG. 9 is a system diagram of still another embodiment of a power plant.

FIG. 9 shows still another embodiment of a power plant. In this embodiment, gaseous ammonia which is generated by the gaseous ammonia generating device 14 is fed to a collection device 17. On the other hand, the liquid ammonia is fed through the metering valve 18 to at least one of the inside of the stationary blades 58 or inside of the moving blades 59 of the turbine 3. By cooling the stationary blades 58 or moving blades 59, ammonia which changes from a liquid state to a gas state is fed into the collection device 17. The gaseous ammonia in the collection device 17 is boosted in pressure by the gas compressor 15 and fed into the combustion chamber 55 of the combuster 2.

In this embodiment, the heat of the stationary blades 58 or moving blades 59 of the turbine 3 is effectively utilized to generate gaseous ammonia. Further, in this embodiment, the stationary blades 58 and the moving blades 59 are cooled, so the stationary blades 58 can not only improve the durability of the moving blades 59, but also can raise the maximum allowable temperature of the inlet temperature of the turbine 3, so can raise the maximum output of the gas turbine engine 1.

Figure 10:
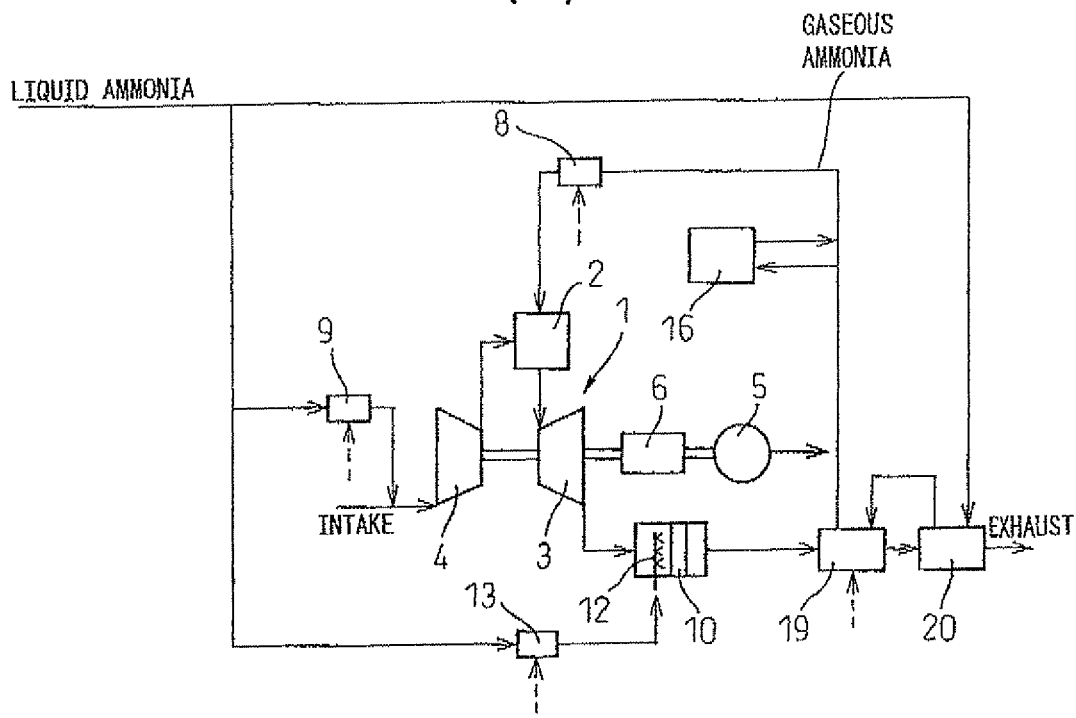
FIG. 10 is a system diagram of still another embodiment of a power plant and a modification of the same.
Figure 10:
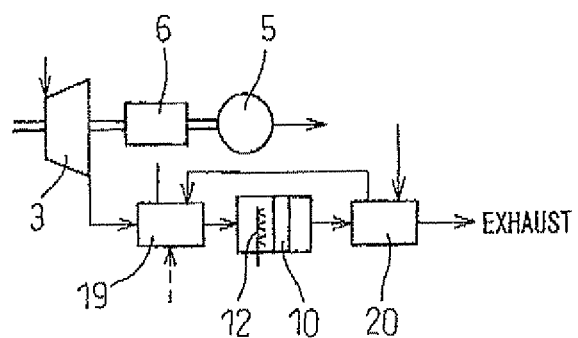

FIG. 10(A) shows still another embodiment of a power plant. In this embodiment, inside the exhaust passage of the gas turbine engine 1, a gas pressure boosting device 19 using the exhaust gas heat to boost the pressure of the gaseous ammonia is arranged. The gaseous ammonia which is boosted in pressure by this gas pressure boosting device 19 is fed through the metering valve 8 to the combustion chamber 55 of the combuster 2. In the embodiment shown in FIG. 10, an evaporator 20 is arranged in the exhaust passage downstream of the gas pressure boosting device 19. The liquid ammonia is converted to gaseous ammonia at the evaporator 20. Next the pressure of the gaseous ammonia is boosted at the gas pressure boosting device 19. In this embodiment, each of the gas pressure boosting device 19 and the evaporator 20 forms an exhaust heat recovery device.

Figure 8:
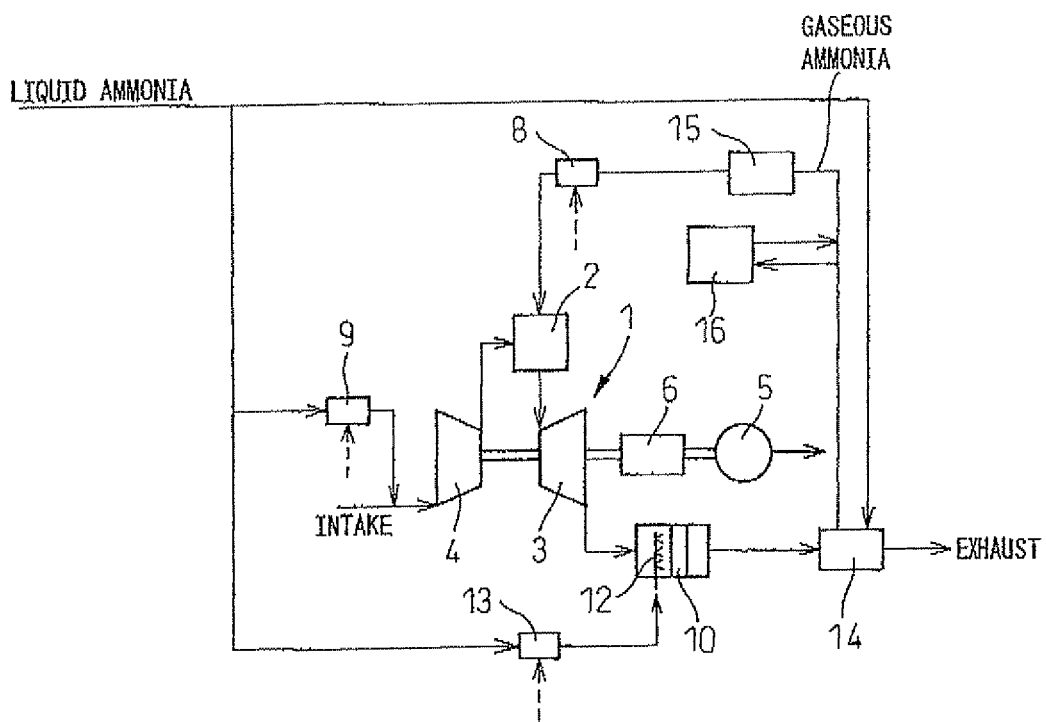
FIG. 8 is a system diagram of still another embodiment of a power plant and a modification of the same.
Figure 8:
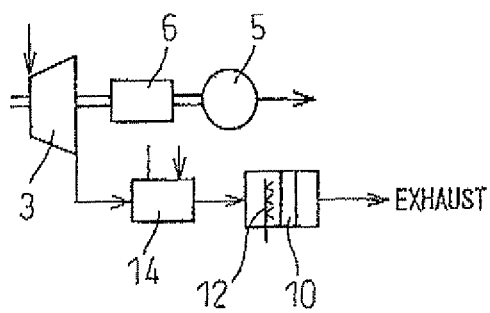

In this way, in this embodiment, the gas pressure boosting device 19 causes the pressure of the gaseous ammonia to be boosted, so there is no longer a need to provide the gas compressor 15 such as shown in FIG. 8 or FIG. 9. Further, the pressure of the gaseous ammonia is boosted, so the gaseous ammonia storage tank 16 stores gaseous ammonia boosted in pressure. At the time of engine startup, the boosted pressure gaseous ammonia which is stored in the gaseous ammonia storage tank 16 is fed to the combustion chamber 55 of the combuster 2.

In the modification shown in FIG. 10(B), to utilize a higher temperature exhaust gas heat, the gas pressure boosting device 19 is arranged upstream of the $NO_x$ selective reduction catalyst 10.

Figure 11:
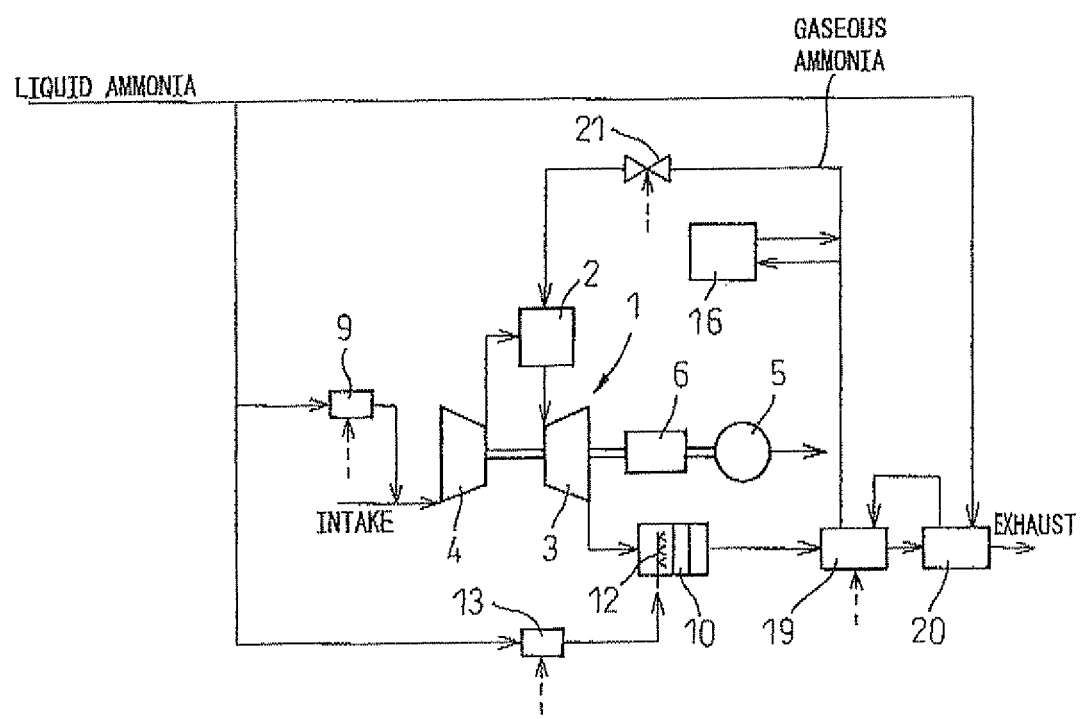
FIG. 11 is a system diagram of still another embodiment of a power plant.

FIG. 11 shows still another embodiment of a power plant. In this embodiment, the outlet pressure of the gaseous ammonia of the gas pressure boosting device 19 can be controlled. By controlling this outlet pressure, the amount of gaseous ammonia which is fed to the combustion chamber 55 of the combuster 2 is controlled. Therefore, in this embodiment, it is no longer necessary to provide a metering valve 8 such as shown from FIG. 8 to FIG. 10. Note that a valve 21 shown in FIG. 11 is an emergency cutoff valve which is closed in an emergency and is normally fully open.

The outlet pressure of the gas pressure boosting device 19 can be controlled by various methods. For example, it is possible to provide a return passage which returns gaseous ammonia from the outlet of the gas pressure boosting device 19 to the inside of the vaporizer 20 and control the outlet pressure to a target pressure by increasing the amount of return of the gaseous ammonia which is returned from the outlet of the gas pressure boosting device 19 to the vaporizer when the outlet pressure becomes higher than the target pressure and by reducing the amount of return of the gaseous ammonia when the outlet pressure becomes lower than the target pressure.

Note that, up to here, the present invention was explained with reference to the gas of application to a gas turbine engine, but the present invention can also be applied to a gasoline engine, diesel engine, or other reciprocating type engine.

LIST OF REFERENCE NUMERALS

1 ... gas turbine engine
2 ... combustor
3 ... turbine
4 ... compressor
5 ... generator
6 ... reduction gear device
7 ... gasifying device
8, 9, 13, 18 ... metering valve
10 ... $NO_x$ selective reduction catalyst
11 ... exhaust heat recovery device
12 ... ammonia feed device
14 ... gaseous ammonia generating device
15 ... gas compressor
16 ... gaseous ammonia storage tank
17 ... collection device
19 ... gas pressure boosting device
20 ... evaporator
21 ... valve

The invention claimed is:

1. A gas turbine engine comprising:
a compressor including an intake port;
a turbine including stationary blades and moving blades;
an $NO_x$ selective reduction catalyst arranged in an exhaust passage of the turbine, wherein the $NO_x$ selective reduction catalyst is configured to selectively reduce $NO_x$ contained in exhaust gas with unburnt ammonia exhausted into the exhaust passage;
a combustor including a combustion chamber and a fuel feed device that feeds fuel comprised of gaseous ammonia into the combustion chamber with combustion gas in the combustion chamber being fed into the turbine;
an ammonia feed device configured to feed liquid ammonia into the intake port of the compressor and at least one of an inside of the stationary blades or an inside of the moving blades of the turbine to cool air in the turbine;
a gaseous ammonia generating device arranged in the exhaust passage to convert liquid ammonia to gaseous ammonia by using exhaust gas heat;
a collection device configured to receive gaseous ammonia generated in the gaseous ammonia generating device and gaseous ammonia changed from a liquid state by cooling the stationary blades or the moving blades; and
a gas compressor that boosts a pressure of the gaseous ammonia in the collection device and feeds the gaseous ammonia boosted in pressure into the fuel feed device.

2. The gas turbine engine as claimed in claim 1, wherein liquid ammonia is fed into said exhaust passage for reducing the $NO_x$ contained in the exhaust gas at the $NO_x$ selective reduction catalyst.

3. The gas turbine engine as claimed in claim 2, wherein the liquid ammonia is the same liquid ammonia that is used for generating gaseous ammonia which is fed into said combustion chamber and that is fed into said intake port and said exhaust passage.

4. The gas turbine engine as claimed in claim 1, wherein gaseous ammonia is fed into said exhaust passage for reducing the $NO_x$ contained in the exhaust gas at the $NO_x$ selective reduction catalyst.

5. The gas turbine engine as claimed in claim 4, wherein the gaseous ammonia is the same gaseous ammonia that is fed into said combustion chamber and that is fed into said exhaust passage.

6. The gas turbine engine as claimed in claim 1, wherein the gaseous ammonia generated by the gaseous ammonia generating device is fed into said combustion chamber.

7. The gas turbine engine as claimed in claim 6, further comprising a gaseous ammonia storage tank for storing the gaseous ammonia that is generated by said gaseous ammonia generating device, wherein
at the time of engine startup, the gaseous ammonia which is stored in the gaseous ammonia storage tank is fed to said combustion chamber.

8. The gas turbine engine as claimed in claim 1, wherein the gas compressor uses exhaust gas heat to boost the pressure of the gaseous ammonia.

9. The gas turbine engine as claimed in claim 8, further comprising a gaseous ammonia storage tank for storing the gaseous ammonia boosted in pressure by said gas compressor, wherein at the time of engine startup, the boosted pressure gaseous ammonia which is stored in the gaseous ammonia storage tank is fed to said combustion chamber.

10. The gas turbine engine as claimed in claim 8, wherein an outlet pressure of the gaseous ammonia of said gas compressor can be controlled and, by controlling said outlet pressure, an amount of gaseous ammonia which is fed to said combustion chamber is controlled.

\* \* \* \* \*